United States Patent
Fujita et al.

(10) Patent No.: US 9,219,925 B2
(45) Date of Patent: Dec. 22, 2015

(54) VIDEO IMAGE CODED DATA DISPLAY METHOD, DEVICE, AND COMMUNICATIONS SYSTEM

(75) Inventors: Yasuhito Fujita, Yokohama (JP); Yoichi Hata, Yokohama (JP); Yoshimitsu Goto, Yokohama (JP); Toshiaki Kakii, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 695 days.

(21) Appl. No.: 13/521,851

(22) PCT Filed: Jan. 4, 2011

(86) PCT No.: PCT/JP2011/050008
§ 371 (c)(1),
(2), (4) Date: Jul. 30, 2012

(87) PCT Pub. No.: WO2011/086952
PCT Pub. Date: Jul. 21, 2011

(65) Prior Publication Data
US 2012/0287338 A1 Nov. 15, 2012

(30) Foreign Application Priority Data
Jan. 14, 2010 (JP) ................... 2010-006046

(51) Int. Cl.
| H04N 19/132 | (2014.01) |
| H04N 19/895 | (2014.01) |
| H04N 19/172 | (2014.01) |
| H04N 19/63 | (2014.01) |
| H04N 19/37 | (2014.01) |
| H04N 19/166 | (2014.01) |
| H04N 19/587 | (2014.01) |

(52) U.S. Cl.
CPC .......... *H04N 19/895* (2014.11); *H04N 19/132* (2014.11); *H04N 19/166* (2014.11); *H04N 19/172* (2014.11); *H04N 19/37* (2014.11); *H04N 19/587* (2014.11); *H04N 19/63* (2014.11)

(58) Field of Classification Search
None
See application file for complete search history.

(56) References Cited

U.S. PATENT DOCUMENTS

| 2003/0126238 A1* | 7/2003 | Kohno et al. ................. 709/220 |
| 2004/0202249 A1 | 10/2004 | Lo et al. |
| 2005/0105557 A1 | 5/2005 | Yamane et al. |

(Continued)

FOREIGN PATENT DOCUMENTS

| CN | 101176353 | 5/2008 |
| EP | 0579844 | 1/1994 |

(Continued)

*Primary Examiner* — Tung Vo
*Assistant Examiner* — Joseph Becker
(74) *Attorney, Agent, or Firm* — Drinker Biddle & Reath LLP (57) ABSTRACT

The present invention relates to a displaying method for video image coded data which prevents deterioration of image quality of a video image as much as possible, and conceals, from an observer, deteriorated video quality caused due to a transmission error. The displaying method selects target image frames to be decoded and target image frames to be discarded, by performing error determination (32) in parallel with an error recovery process and other image restoration processes, and decodes (33) only the selected target image frames. A predetermined display device sequentially displays (34) only the decoded target image frames while adjusting a frame rate.

10 Claims, 8 Drawing Sheets

(56) References Cited

U.S. PATENT DOCUMENTS

| | | |
|---|---|---|
| 2005/0157800 A1 | 7/2005 | Kim |
| 2007/0177678 A1 | 8/2007 | Subramania et al. |
| 2009/0135918 A1* | 5/2009 | Mak-Fan et al. ......... 375/240.28 |

FOREIGN PATENT DOCUMENTS

| | | |
|---|---|---|
| EP | 1473939 | 11/2004 |
| JP | 2003-169040 | 6/2003 |
| JP | 2003-179580 | 6/2003 |
| JP | 2004-193924 | 7/2004 |
| JP | 2006-148409 | 6/2006 |
| JP | 2006-203804 | 8/2006 |
| JP | 2007-519338 | 7/2007 |
| JP | 2007-211511 | 8/2007 |
| JP | 2008-203597 | 9/2008 |

* cited by examiner

IMAGE FRAME $f_n$

VIDEO IMAGE CODED DATA DISPLAY METHOD, DEVICE, AND COMMUNICATIONS SYSTEM

TECHNICAL FIELD

The present invention relates to a technology for displaying video image coded data distributed through an existing wired or wireless network. More particularly, the present invention relates to a method, device, and communication system capable of concealing a deteriorated image quality caused due to an error in transmitting a video to be displayed on a display device.

BACKGROUND ART

With the development of the high-speed data communication technologies in recent years, large volumes of data such as video image data can be transmitted/received through an existing network to/from users using the network. However, transmission and reception of a large volume of data increases the traffic, allowing some of the network users to occupy the network resource. This situation makes it difficult for all the network users to benefit from the network resource. For this reason, the communications carriers, the service providers and the like limit the bandwidth of each transmission channel and thereby implement the operations for preventing the network resource from being occupied by some of the network users.

Meanwhile, with the development of the digital signal processing technologies, active studies have been performed on video compression technologies in order to enable more efficient data transmission using a transmission channel of a limited bandwidth. Motion-JPEE, Motion-JPEG2000, H264 and the like are known as the video compression technologies, wherein while each image frame data to be transmitted is compressed (coded), the compressed image frame data is decoded by a receiver, in order to display a video image on a monitor and the like.

However, a transmission error caused due to deteriorated communication quality and the like occurs frequently in a video image distribution service that uses the network. In such a case, block noise and the like occur in the video on the monitor regenerated by the receiver, causing obvious image deterioration. Patent Documents 1 to 3 described below disclose technologies that prevent the deterioration of image quality as much as possible when regenerating the video image data, by executing a re-transmission process for re-transmitting the video image data from the transmitter side to the receiver side and an error recovery process on video image data that is not received successfully, even when a transmission error occurs in the video image distribution service.

CITATION LIST

Patent Document

Patent Document 1: Japanese Translation of PCT Application No. 2007-519338
Patent Document 2: Japanese Patent Application Laid-Open No. 2007-211511
Patent Document 3: Japanese Patent Application Publication Laid-Open No. 2008-203597

SUMMARY OF INVENTION

Problems that the Invention is to Solve

The present inventors have examined the conventional technologies for displaying video image coded data, especially the error compensation technologies (also known as error concealment technologies), and as a result, have discovered the following problems. That is, the technologies described in the abovementioned Patent Documents 1 to 3 are primarily intended to prevent deterioration of the quality of a video image to be displayed on a monitor, as much as possible, by executing a re-transmission process, an error recovery process (error correction, compensation by inter-frame prediction, etc.), and other image restoration processes, even when a transmission error occurs when transmitting/receiving video image coded data. However, when the video image cannot be restored after all, the distributed video image with deteriorated image quality is displayed on the monitor and the like. As a result, block noise and the like occur in the video on the monitor, allowing an observer to recognize obvious image deterioration. In particular, when transmitting/receiving the actual video image coded data, the data becomes deteriorated more than one can handle. Therefore, unfortunately, deterioration of the quality of the displayed image is inevitable.

The present invention has been developed to eliminate the problems described above. It is an object of the present invention to provide a displaying method, device and communication system for video image coded data that can avoid, as much as possible, the occurrence of image quality deterioration upon regeneration of video image data using an image restoration process, and at the same time conceal from an observer a deteriorated image quality of a displayed video that is caused due to a transmission error.

Means for Solving the Problems

It is generally known that, when the quality of video image data with a certain or higher level of frame rate deteriorates, the deterioration of the image quality itself is recognized by an observer more easily than the decrease of the frame rate. The present invention was completed based on such visual characteristics of an observer and is capable of effectively concealing missing data and the like caused due to a transmission error, without allowing the observer to recognize deterioration of quality of a video to be displayed, while executing the re-transmission process, the error recovery process, and other image restoration processes as much as possible. More specifically, the communication system according to the present invention comprises receiving means such as a server that is connected to a network, and transmission means such as a terminal device, and processes video image coded data that is configured by coded data of a plurality of compressed image frames and distributed through predetermined transmission means. Particularly a displaying method that is implemented by the receiving means (the displaying method for video image coded data according to the present invention) has a receiving step of sequentially receiving the coded data of the plurality of image frames to be delivered, a selection step of sequentially selecting image frames to be decoded, from among a plurality of target image frames to be displayed per unit time out of the plurality of received image frames, a decoding step, and a display step. The present invention may be applied alone or in combination with a conventional error concealment technology, when displaying video image coded data.

The selection step calculates a missing data rate corresponding to missing data caused due to a transmission error (error determination), for each of the coded data of the target image frames that are displayed per unit time and disposed at a predetermined interval, and then selects, based on the obtained calculation result, target image frames to be decoded out of the target image frames. The decoding step decodes only the coded data of the target image frames selected in the selection step. Therefore, the target image frames that are not selected in the selection step (these target image frames are not decoded because the data qualities thereof are deteriorated to the certain level or lower) are discarded. The display step causes a predetermined display device to display the target image frames decoded in the decoding step, while adjusting a frame rate based on the number of target image frames.

The present invention described above can effectively conceal deteriorated image quality of a displayed video by causing the predetermined display device to display the image frames of a certain quality level or higher while adjusting the frame rate. Furthermore, when the displaying method according to the present invention is used in combination with a conventional error concealment technology, even the target frames that normally are not decoded as a result of the error determination can be decoded within an allowance by performing the error recovery process using the conventional error concealment technology. In this case, the number of video image frames to be discarded can be reduced, further improving the concealment effect of the present invention.

It is preferred that the displaying method for video image coded data according to the present invention request for re-transmission of missing data included in the received coded data, prior to completion of reception of the coded data of the target image frames. If decodable data can be received by sending the re-transmission request for removing the missing data, then it is not necessary to perform the image restoration process or to determine whether to discard the target image frames. This is because the number of missing data can be eventually reduced as soon as the decodable data are received. Normally, a single image frame is transmitted/received in units of packets; however, the time of "completion of reception of the coded data of the target image frames" may be determined based on, for example, the time when a final packet of a target image frame is received, the time when a first packet of the next image frame is received, or at the time of timeout. Moreover, the coded data that correspond to the missing data requested to be re-transmitted are preferably distributed prior to the distribution of other coded data that are scheduled to be transmitted. This is because when there is a delay in the re-transmission of the coded data that correspond to the missing data requested to be re-transmitted (the normal coded data that can be decoded prior to the distribution thereof), a delay is caused in the decoding process to be performed on the subsequent image frames.

The selection step in the displaying method for video image coded data according to the present invention may select a target image frame to be decoded out of the target image frames, based on the calculation result of the missing data rate and the continuity of the received data. Even with the coded data having the missing data rate outside the allowance, it is possible to acquire information that is enough to conceal or compensate the missing data by means of other received data of the same frame or inter-frame prediction, as long as the continuity of the received data is kept at a certain level.

The selection step in the displaying method for video image coded data according to the present invention may also request for re-transmission of at least any of the target image frames that are not the subject of the decoding. Even when the target image frames are to be destroyed, it is sometimes appropriate to issue the re-transmission request, depending on the image characteristics thereof, until the missing data rate falls within the allowance again.

When adjusting the frame rate in the display step, the displaying method for video image coded data according to the present invention discards only the target image frames that are not selected in the selection step, without changing the time-axial positions of the target image frames to be displayed per unit time. However, continuously discarding the plurality of image frames in the selection step spreads the frame interval between the target image frames to be displayed, allowing the observer to recognize the target image frames being displayed intermittently. When adjusting the frame rate in such a case, the target image frames that are decoded in the decoding step are preferably disposed evenly within a unit time in a manner that the frame interval therebetween is constant. As described above, because the quality of each target image frame to be displayed does not at all or hardly becomes deteriorated by the frame rate adjustment, the deterioration of the quality of the video to be displayed can be effectively concealed by taking advantage of the visual characteristics of the observer.

The displaying method for video image coded data according to the present invention can detect pixel movement by comparing adjacent target image frames out of the target image frames, and perform, on a space region in the frame data of a target image frame in which the pixel movement is detected, weighting for determining a selection reference value in the selection step. The space region in which the pixel movement is detected is a region that is likely to be recognized by the observer; thus, the target image frames to be displayed are preferably prevented from being discarded as much as possible. For this reason, it is preferred to make a difference between selection reference values such that the selection reference value of the target image frame where the pixel movement is detected is lower than the selection reference value of other target image frame.

In the displaying method for video image coded data according to the present invention, the coded data of the target image frames received in the receiving step each include a plurality of types of information arranged a priority order. In addition, the coded data of each of the target image frames are distributed sequentially in descending order of priority of the plurality of types of information. When a single image frame is divided into a plurality of transmission packets, highly important information items (with high degrees of contribution to image decoding) are preferentially transmitted, increasing the likelihood of restoring the data. The order of priority is, for example, an order of image quality, resolution, color component, position (space region) and the like, which is determined beforehand by the transmitter side.

The display device according to the present invention is a device for realizing the displaying method for video image coded data configured as described above, and has, at least, an input/output unit, a memory, a controller, and a display unit. Specifically, the input/output unit imports video image coded data configured by the coded data of the plurality of compressed image frames, through predetermined transmission means. The memory temporarily stores the video image coded data imported through the input/output unit. The controller executes the displaying method for video image coded data configured as described above (the displaying method for video image coded data according to the present invention). The display unit sequentially displays the decoded target image frames in accordance with a frame rate adjusted by the controller.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

Effects of the Invention

The displaying method, device and communication system for video image coded data according to the present invention can discard only deteriorated image frames while performing the error recovery process and the like to prevent deterioration of image quality as much as possible when regenerating the video image data, and causes a predetermined display device to sequentially display decoded image frames while adjusting the frame rates. Therefore, the present invention can effectively conceal the deteriorated quality of a displayed video while minimizing the number of deteriorated image frames to be discarded.

REFERENCE SIGNS LIST

10 . . . network; 20 . . . server; 30 . . . terminal device (display device); 300 . . . information processor; 310, 340 . . . input/output unit (I/O); 320 . . . controller; and 400 . . . display monitor.

DESCRIPTION OF EMBODIMENTS

Embodiments of the displaying method, device and communication system for video image coded data according to the present invention are described hereinafter in detail with reference to FIGS. 1 to 8. The same reference numerals are used to explain the corresponding elements in the views; thus the overlapping explanations are omitted accordingly.

Figure 1:
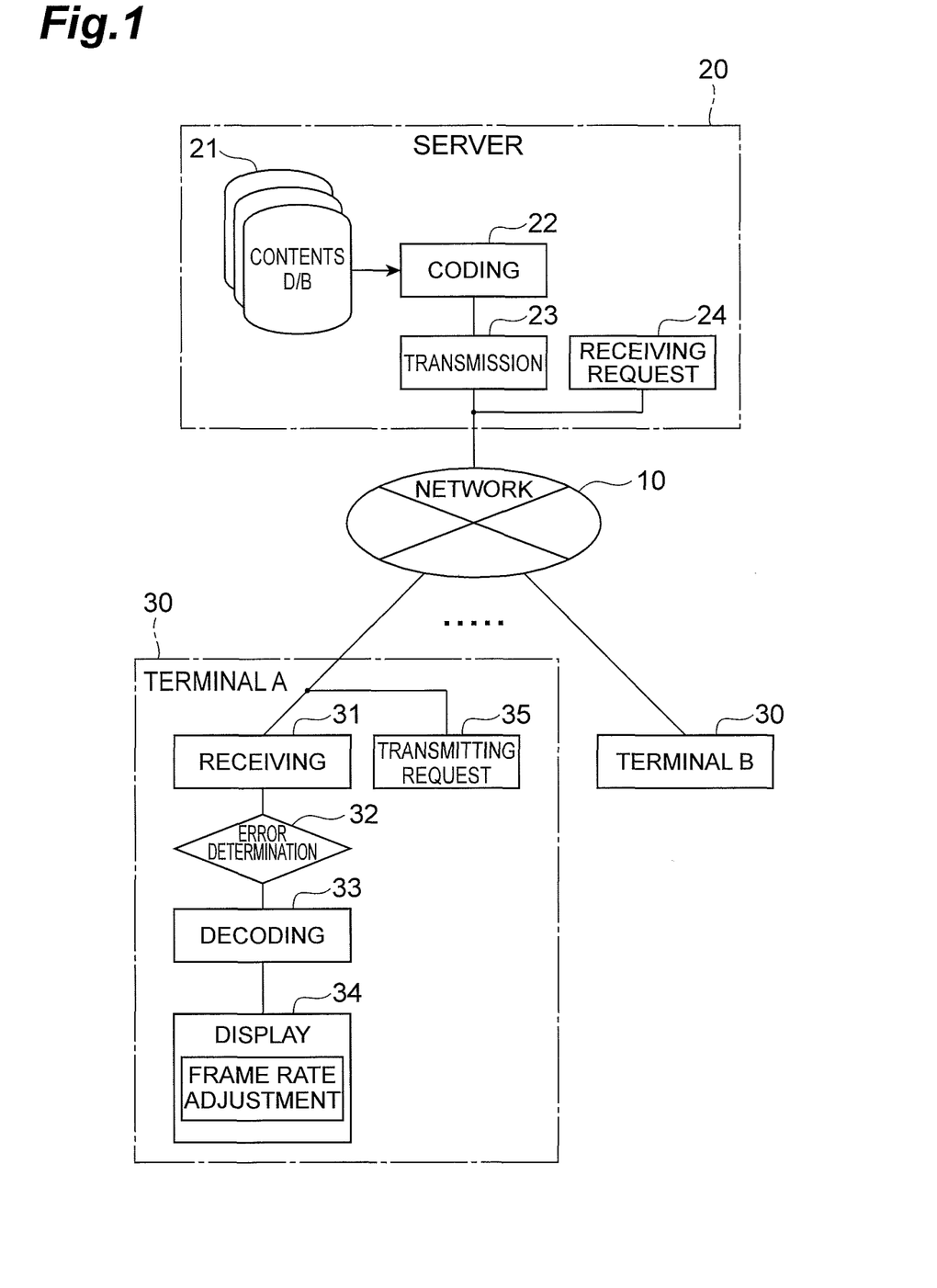
FIG. 1 is a schematic view for showing an example of a system configuration (the communication system according to the present invention) for realizing an embodiment of the displaying method for video image coded data according to the present invention.

FIG. 1 is a schematic view for showing an example of a system configuration (the communication system according to the present invention) for realizing an embodiment of the video image coded data displaying method according to the present invention. In a communication system shown in FIG. 1, video image coded data to be displayed in the present invention is distributed from a server 20, which is video image coded data transmission means, through a network 10 to each terminal device 30 (a terminal A and a terminal B in the view), which is video image coded data receiving means, and is configured by coded data of a plurality of compressed image frames. In the communication system shown in FIG. 1, either one of the terminal devices connected to the network 10 functions as a content distribution server, and the other terminal device 30 functions as a reception terminal device (the display device according to the present invention).

The server 20 has a database 21 (D/B in the view) in which a plurality of types of distribution contents are stored. The video image coded data is generated by compressing video data, which are read from the D/B 21, with respect to each image frame (coding 22). Video image coded data generated in the manner described above (a plurality of divided transmission packets) are distributed from the server 20 to the terminal device 30 (e.g., the terminal A) via the network 10 (transmission 23). The server 20 receives a re-transmission request from the terminal A (request reception 24) and adjusts an order of transmitting the transmission packets.

The video image coded data distributed from the server 20 have a previously-determined priority order, i.e., an order of image quality, resolution, color component, and position. The server 20 distributes the video image coded data to the terminal A in descending order of transmission packets (transmission 23).

The terminal A, on the other hand, receives the video image coded data from the server 20 via the network 10 (reception 31), and selects and discards target image frames to be displayed per unit time (error determination 32). After decoding the selected target image frames (decoding 33), the terminal A causes a predetermined display device to sequentially display these target image frames while adjusting a display frame rate (display 34). Note that the terminal B performs the same display control as the terminal A. The error determination 32 may be carried out prior to the decoding 33, during the decoding 33, or after completion of the decoding 33.

Moreover, in order to reduce the number of missing data, the terminal A requests for re-transmission of the missing data included in the received coded data, prior to completion of reception of the coded data of the target image frames (request transmission 35). The time of "completion of reception of the coded data of the target image frames" is determined based on, for example, the time when a final packet of a target image frame is received, the time when a first packet of the next image frame is received, or at the time of timeout. Meanwhile, the server 20 distributes the transmission packet that includes the missing data requested to be re-transmitted, before distributing the other transmission packets (transmission 23).

Figure 2:
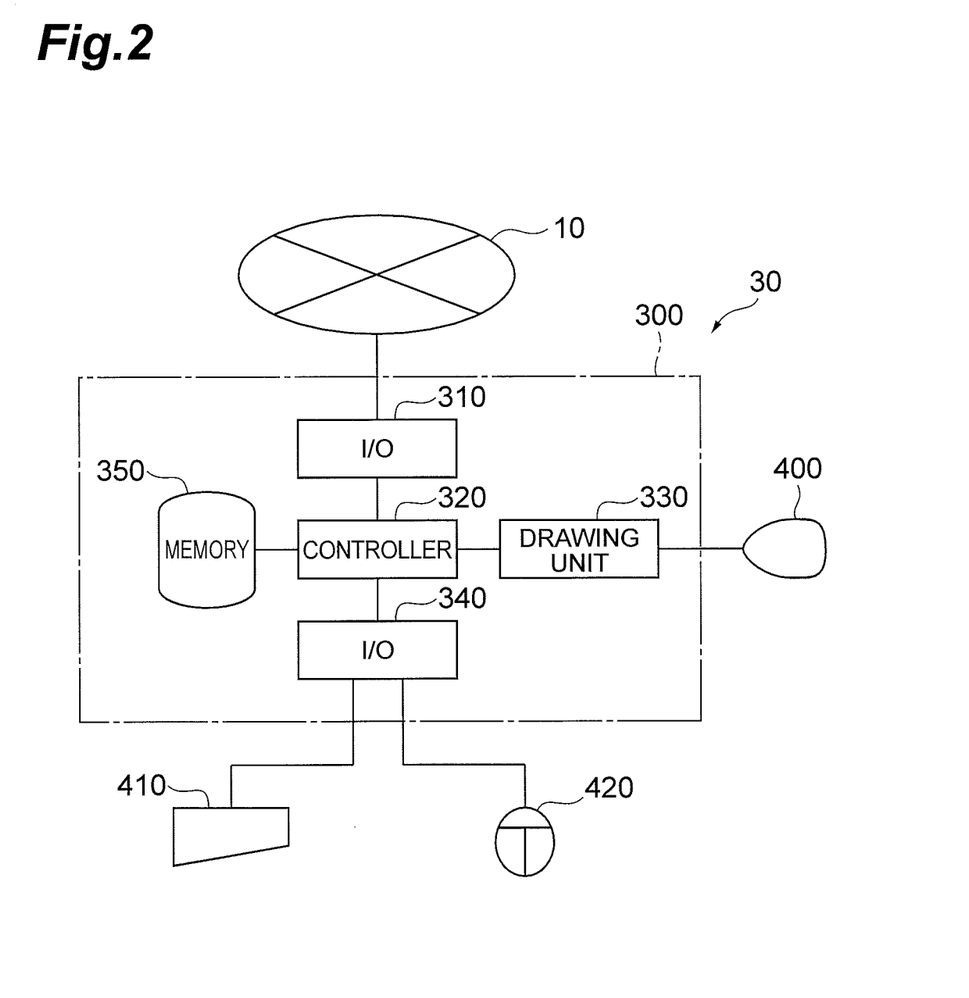
FIG. 2 is a view showing a specific structure of a terminal device (a display device according to the present invention) shown in FIG. 1.

FIG. 2 is a view showing a specific structure of the terminal device 30 shown in FIG. 1 (the display device according to the present invention, corresponding to both the terminals A and B shown in FIG. 1). The terminal device shown in FIG. 2 is configured by an information processor 300 and a display monitor 400. The information processor 300 has an input/output unit 310 (I/O), a controller 320, a rendering unit 330, an input/output unit 340, and a memory 350.

Specifically, the I/O 310 is an interface for importing the video image coded data via the network 10. The I/O 340 is an interface for external input devices such as a keyboard 410 and a mouse (pointing device) 420. The memory 350 stores the video image coded data imported through the I/O 310, a program for executing the video image coded data displaying method according to the present invention, and various types of control data. The controller 320 executes the program stored in the memory 350 (the program for executing the video image coded data displaying method according to the present invention). The rendering unit 330 is an image processor that causes the display monitor 400 to sequentially display the image frames decoded by the controller 320, wherein the display monitor 400 displays, in response to a display control signal from the controller 330, the image data decoded according to a predetermined frame rate.

Figure 3:
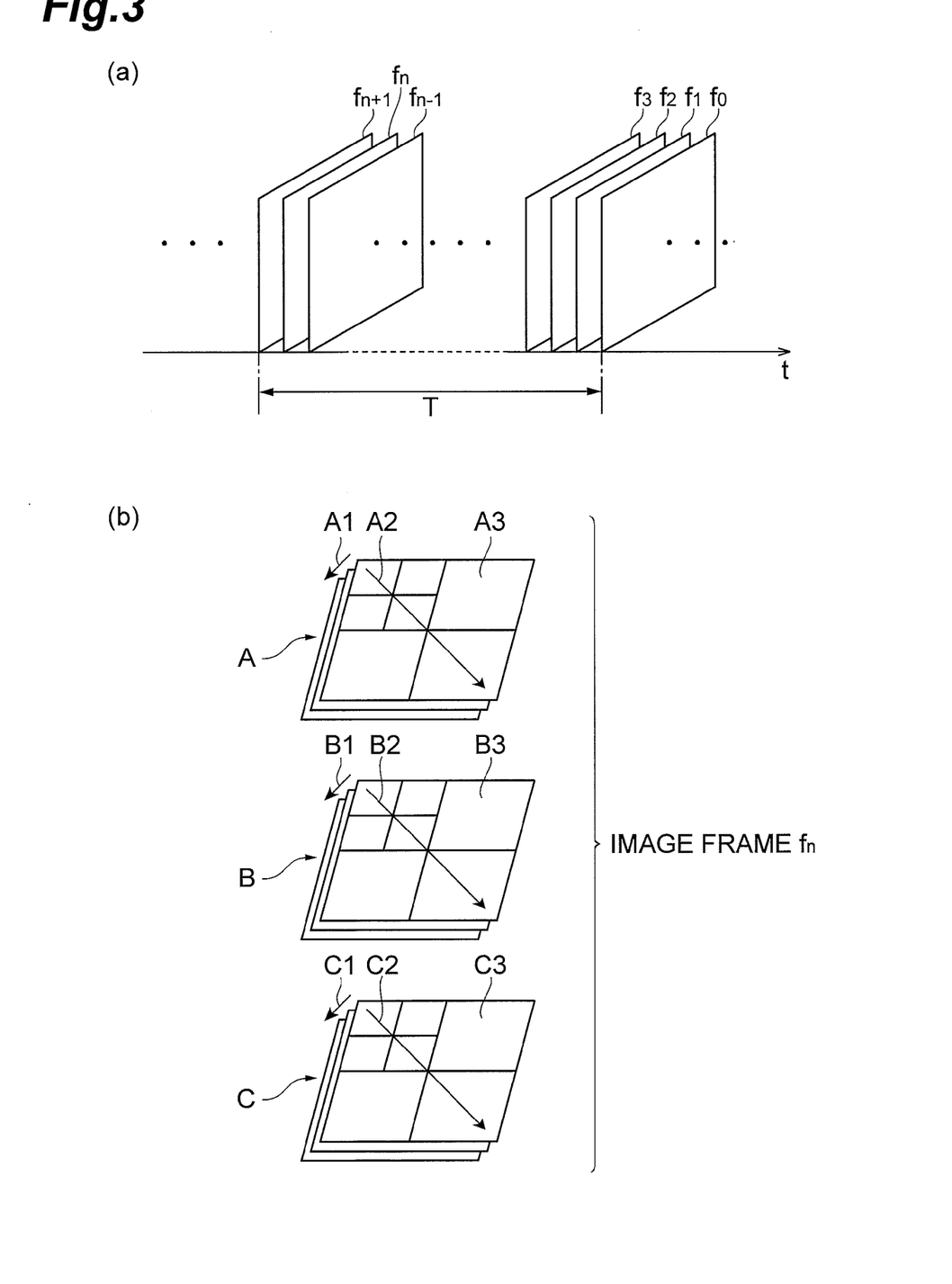
FIG. 3 is a view for showing a structure of video image coded data to be displayed.

A structure of the video image coded data to be displayed and controlled in the terminal device 30 having the above-mentioned structure is shown in FIG. 3. FIG. 3 is a view for showing a structure of the video image coded data to be displayed.

As shown in the area (a) of FIG. 3, video image data itself is configured by a plurality of image frames $f_n$ (n=0, 1, 2, . . . ) that are disposed on a time axis at a certain interval (frame interval). Video image coded data is obtained by compressing (coding) each of the plurality of image frames $f_0$ to $f_{n+1}$. The frame rate is defined based on the number of image frames to be expressed that are disposed in a unit time T.

The area (b) of FIG. 3 shows a structure of frame data of, for example, a Motion-JPEG2000 image frame, which is an image frame $f_n$. The image frame $f_n$ is configured by a plurality of types of hierarchical scalabilities. Color components A, B, C, image qualities A1, B1, C1, resolutions A2, B2, C2, and space regions A3, B3, C3 are designated as the scalabilities. In the error determination 32 in the terminal A shown in FIG. 1, a weighted missing data rate is set for each of the scalabilities (the color component, image quality component, resolution component, and space region component) of the image frame $f_n$, and then image frames to be decoded are selected with reference to the set missing data rate. The missing data rate here is defined for each scalability as a ratio between a total number of components to be subjected to the error determination and the number of components that are missing due to a transmission error or the like.

Figure 4:
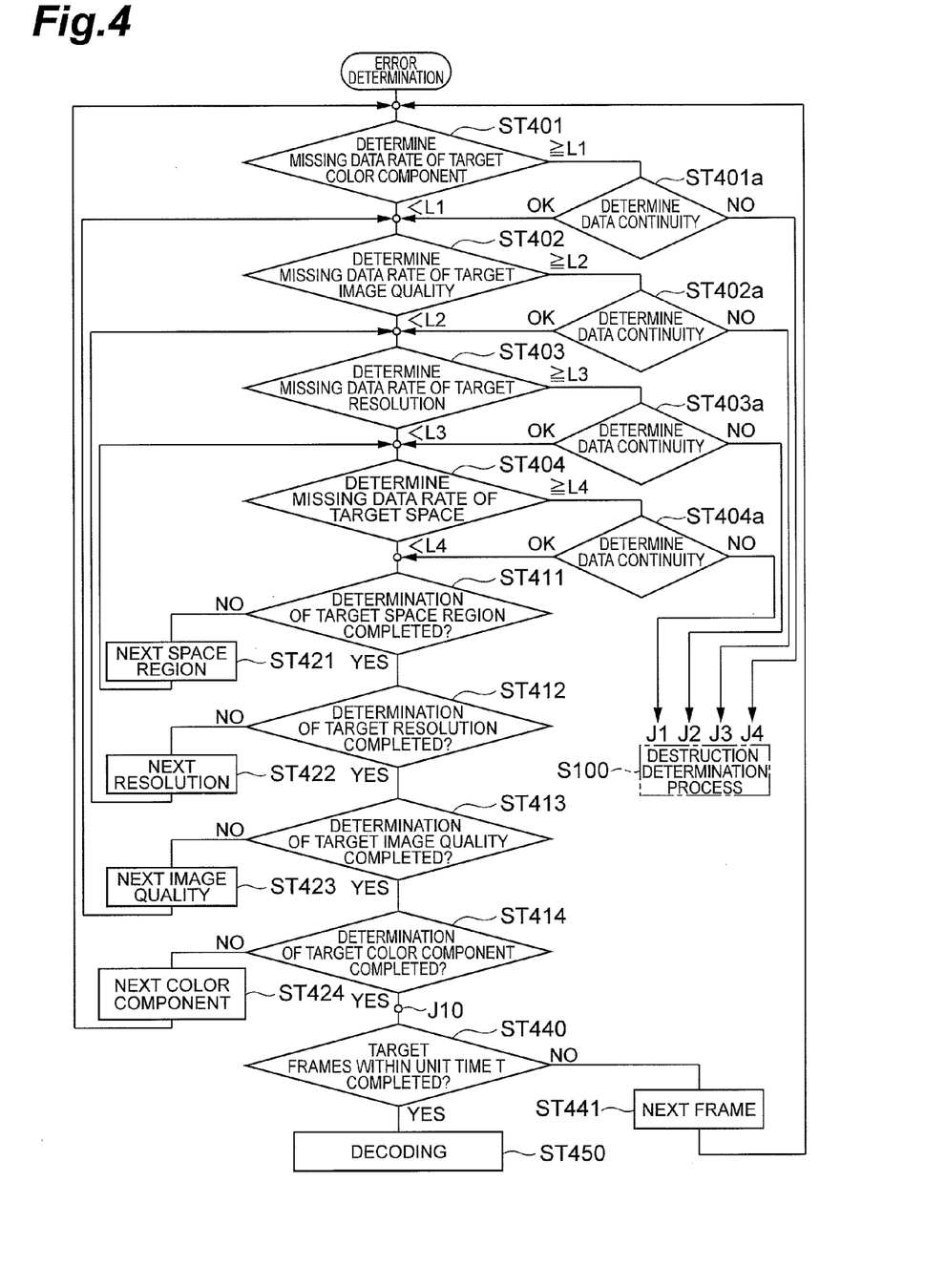
FIG. 4 is a flowchart for showing a primary step according to the embodiment of the video image coded data displaying method according to the present invention.
Figure 5:
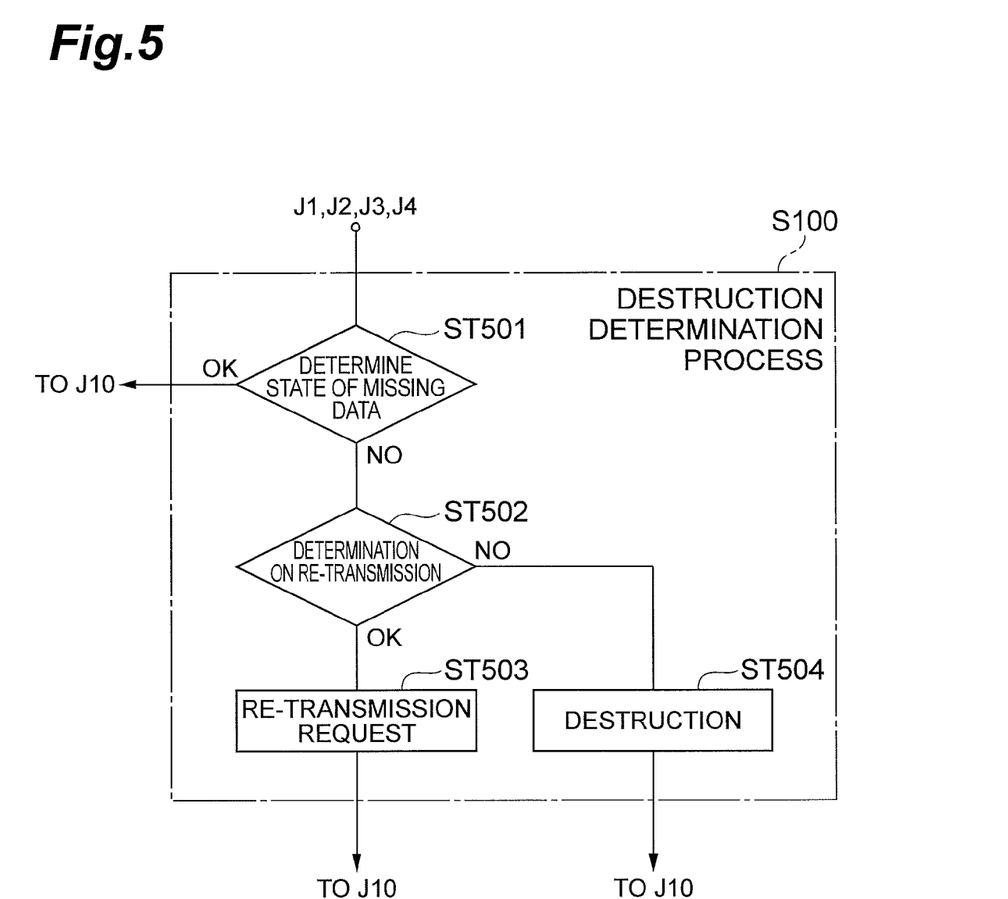
FIG. 5 is a flowchart for showing a destruction determination process in the video image coded data displaying method according to the present invention.

A selection step performed between the error determination 32 and the decoding 33 is described in detail using the flowcharts shown in FIGS. 4 and 5.

First, in this selection step, mainly the error determination is performed on the image frames to be displayed per unit time T while changing the target image frames sequentially (steps ST440, ST441). In the flowchart shown in FIG. 4, an embedded structure is adopted as an error determination step for each scalability; however, for the sake of explanation, the error determination is executed independently on each target scalability. Therefore, there are no substantial differences between the detail of the following description and the flowchart shown in FIG. 4.

In each of the target image frames, the missing data rate of a target color component is determined (step ST401). The determination in this step ST401 is performed sequentially on all of the color components that configure the frame data of the image frames to be subjected to the error determination (steps ST414, ST424). Meanwhile, data continuity is checked when the calculated missing data rate is equal to or greater than a previously weighted determination value L1 (step ST401a). When the missing data rate is less than an acceptable value in the error determination performed on the target color component, or when a certain level of data continuity that is enough to ensure information required for data interpolation is confirmed even when the missing data rate is equal to or greater than the acceptable value, the error determination is performed on the image quality component of each target image frame. On the other hand, as the error determination regarding the target color component of each target image frame, a destruction determination process S100 is performed when it is determined based on both the missing data rate and the data continuity that the image cannot be restored (J1).

Missing data rate determination regarding the image quality components (step ST402) is also performed sequentially on all of the image quality components of the frame data configuring the image frames to be subjected to the error determination (step ST413, ST423). Meanwhile, the data continuity is checked when the calculated missing data rate is equal to or greater than a previously weighted determination value L2 (step ST402a). When the missing data rate is less than an acceptable value in the error determination performed on the target quality component, or when a certain level of data continuity that is enough to ensure information required for data interpolation is confirmed even when the missing data rate is equal to or greater than the acceptable value, the error determination is performed on the resolution component of each target image frame. On the other hand, as the error determination regarding the target image quality component, the destruction determination process S100 is performed when it is determined based on both the missing data rate and the data continuity that the image cannot be restored (J2).

Missing data rate determination regarding the resolution components (step ST403) is also performed sequentially on all of the resolution components of the frame data configuring the image frames to be subjected to the error determination (steps ST412, ST422). Meanwhile, the data continuity is checked when the calculated missing data rate is equal to or greater than a previously weighted determination value L3 (step ST403a). When the missing data rate is less than an acceptable value in the error determination performed on the target resolution component, or when a certain level of data continuity that is enough to ensure information required for data interpolation is confirmed even when the missing data rate is equal to or greater than the acceptable value, the error determination is performed on the space region component of each target image frame. On the other hand, as the error determination regarding the target resolution component, the destruction determination process S100 is performed when it is determined based on both the missing data rate and the data continuity that the image cannot be restored (J3).

Missing data rate determination regarding the space region (position) components (step ST404) is also performed sequentially on all of the space region components of the frame data configuring the image frames to be subjected to the error determination (steps ST411, ST421). Meanwhile, the data continuity is checked when the calculated missing data rate is equal to or greater than a previously weighted determination value L4 (step ST404a). When the missing data rate is less than an acceptable value in the error determination performed on the target space region component, or when a certain level of data continuity that is enough to ensure information required for data interpolation is confirmed even when the missing data rate is equal to or greater than the acceptable value, the error determination is performed on the space region component of each target image frame. On the other hand, as the error determination regarding the target resolution component, the destruction determination process S100 is performed when it is determined based on both the missing data rate and the data continuity that the image cannot be restored (J4).

As shown in FIG. 5, the state of the missing data is determined in the destruction determination process S100 (step ST501). When step ST501 is executed based on any of the determination results J1 to J4, at least any of the color component, the image quality component, the resolution component, and the space region component satisfies a destruction criterion. However, when the image quality component and the resolution component clear the error determination, then an image of practically sufficient quality can be decoded. In this case, the process is shifted to a junction J10. Furthermore, even when it is determined in step ST501 that the image cannot be restored, sometimes it is better to make a request for re-transmission of the missing data prior to completion of reception of the frames or until each component reaches the acceptable value when each component is not at the acceptable value, depending on the characteristics of each image frame. Step ST502, therefore, determines the need for issuance of the re-transmission request (step ST502). When it is determined that the re-transmission request is necessary, request transmission is performed (request transmission 35 in FIG. 1) (step ST503), and the process is shifted to the junction. When it is determined in step ST502 that the re-transmission request is not necessary, the relevant target image frames are destroyed (step ST504), and the process is shifted to the junction J10.

Only the image frames, which have the missing data rates falling within the allowances (less than the set values L1, L2, L3, L4), have the data continuity confirmed, and satisfy the other conditions in the error determination performed on each scalability, are selected and subsequently decoded (step ST450).

In the error determination described above, the previously weighted determination values (L1, L2, L3, L4) are set with respect to the scalabilities, but the weighted values can be changed dynamically. For example, as shown in the area (a) of FIG. 6, movement of a pixel A may be detected by comparing the continuous image frames $f_n$ and $f_{n-1}$, and then weighting for determining a selection reference value in the selection step may be performed on a space region of the frame data of the target image frame $f_n$ in which the pixel movement is detected.

Figure 6:
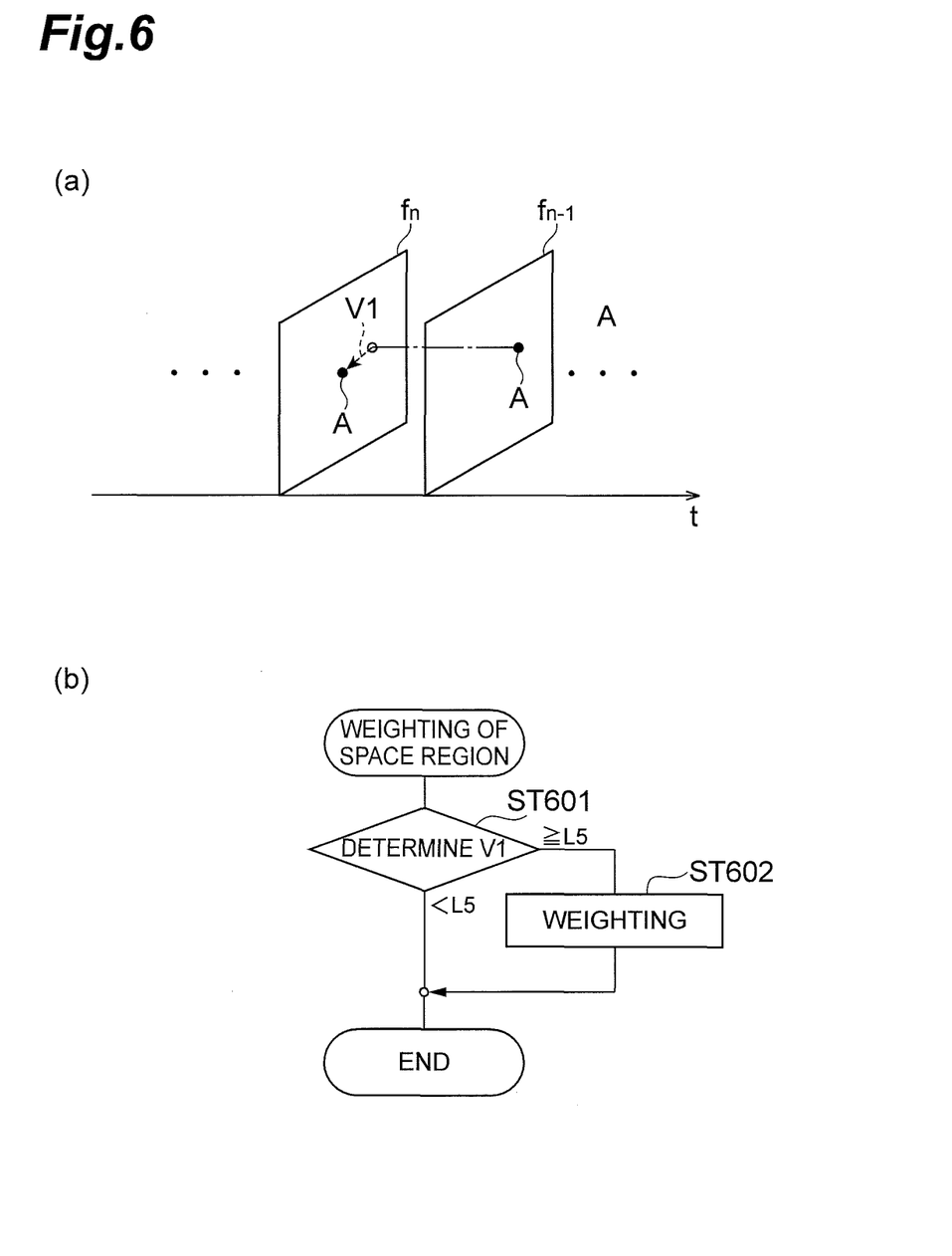
FIG. 6 is a view for showing a weighting step in the video image coded data displaying method according to the present invention.

More specifically, as shown by the flowchart in the area (b) of FIG. 6, when it is detected that the pixel A moves by V1 as a result of comparing the continuous image frames $f_n$ and $f_{n-1}$, this distance V1 is compared with a previously set determination value L5 (step ST601). When the distance V1 is equal to or greater than the determination value L5, a weighting operation is performed by changing the determination value L4 that is used when the error determination is performed on the space region configuring the frame data of the target image frame (step ST602). The space region in which the pixel movement is detected is a region that is likely to be recognized by the observer; thus, it is particularly preferred that the target image frames to be displayed be prevented from being discarded as much as possible. Therefore, executing the weighting step shown by the flowchart in the area (b) of FIG. 6 makes a difference between the determination values (selection reference values) such that the determination value of the target image frame $f_n$ where the movement of the pixel A is detected is lower than the determination values of the other target image frames.

Besides the error determination described above (error determination performed in the order of the color, quality, resolution, and space components, see FIG. 4), for example, determination of the scalabilities may be performed in a different order as the error determination method. The error determination is not necessarily performed with respect to each scalability; thus, a cumulative value of the missing data rates corresponding to the scalabilities may be obtained, and then the error determination may be performed based on this cumulative missing data rate. In addition, an image quality evaluation index such as PSNR or SSIM may be used.

Next, a frame rate adjustment method of the video image coded data displaying method according to the present invention is described in detail with reference to FIGS. 7 and 8. As described above, the video image coded data displaying method according to the present invention was completed based on the knowledge that the observer is more sensitive to deterioration of image quality of a displayed image than increase/decrease of the frame rate. The various steps of frame adjustment are performed based on fluctuations of the frame interval (occurring simultaneously with fluctuations of the number of image frames that are actually selected from among the image frames to be displayed per unit time T).

Figure 7:
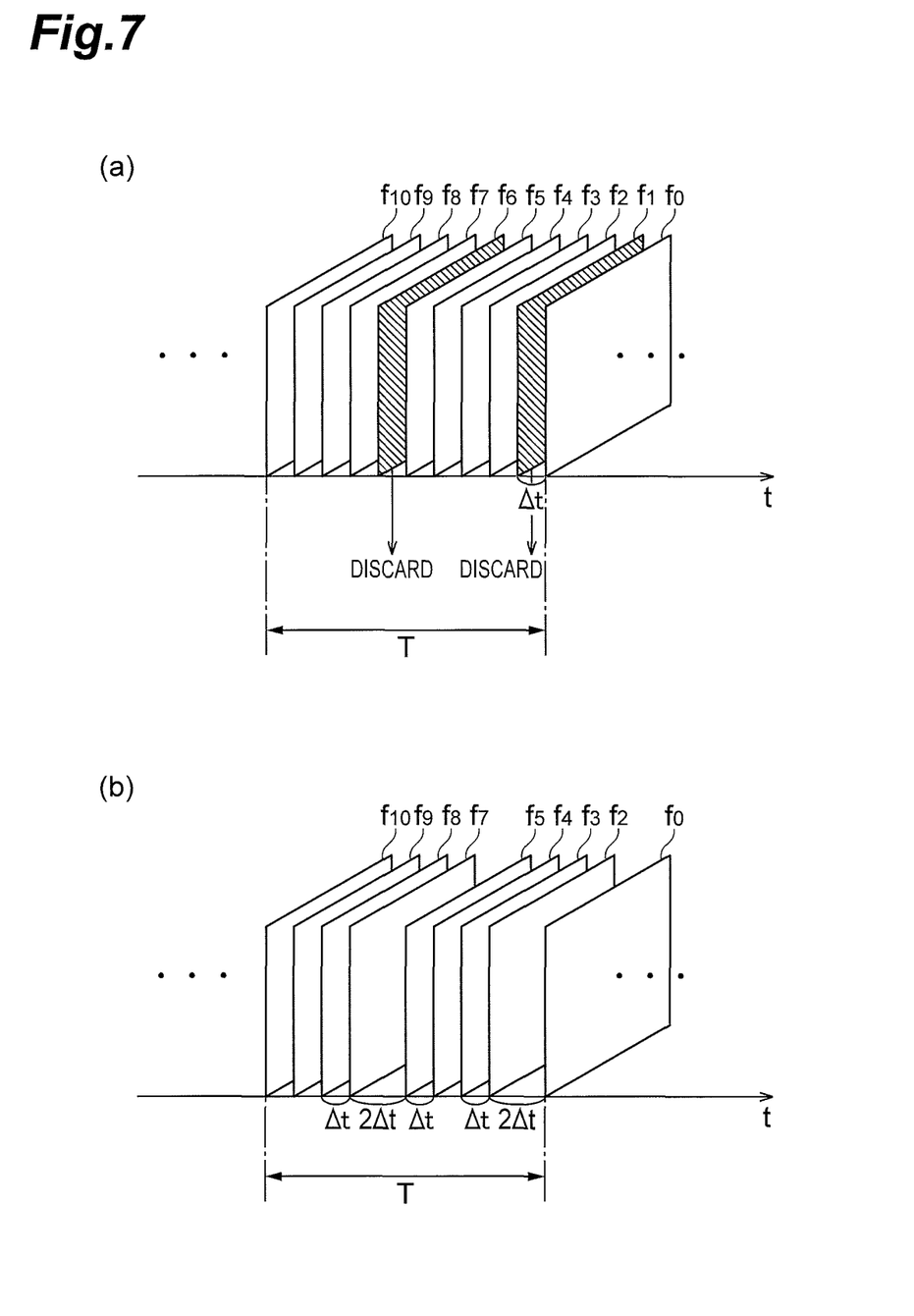
FIG. 7 is a view for showing a first example of frame rate adjustment in the video image coded data displaying method according to the present invention.

For instance, FIG. 7 shows an example of frame rate adjustment that is performed when the maximum value of the frame interval obtained when discarding some image frames is relatively small. More specifically, as shown in the area (a) of FIG. 7, when the image frames $f_1$ and $f_6$ are discarded by the selection step during the execution of display control on the plurality of image frames $f_0$ to $f_{10}$ (frame rate: 11/T) disposed evenly at a frame interval of $\Delta t$ within the unit time T, the maximum frame interval per unit time T between the image frames $f_0$, $f_2$ to $f_5$, $f_7$ to $f_{10}$ to be decoded is $2\Delta t$, which is relatively small. Thus, as shown in the area (b) of FIG. 7, the decoded image frames $f_0$, $f_2$ to $f_5$, $f_7$ to $f_{10}$ are sequentially displayed on the display monitor 400 (see FIG. 2) (frame rate: 9/T) without the simply discarded image frames $f_1$ and $f_6$.

Figure 8:
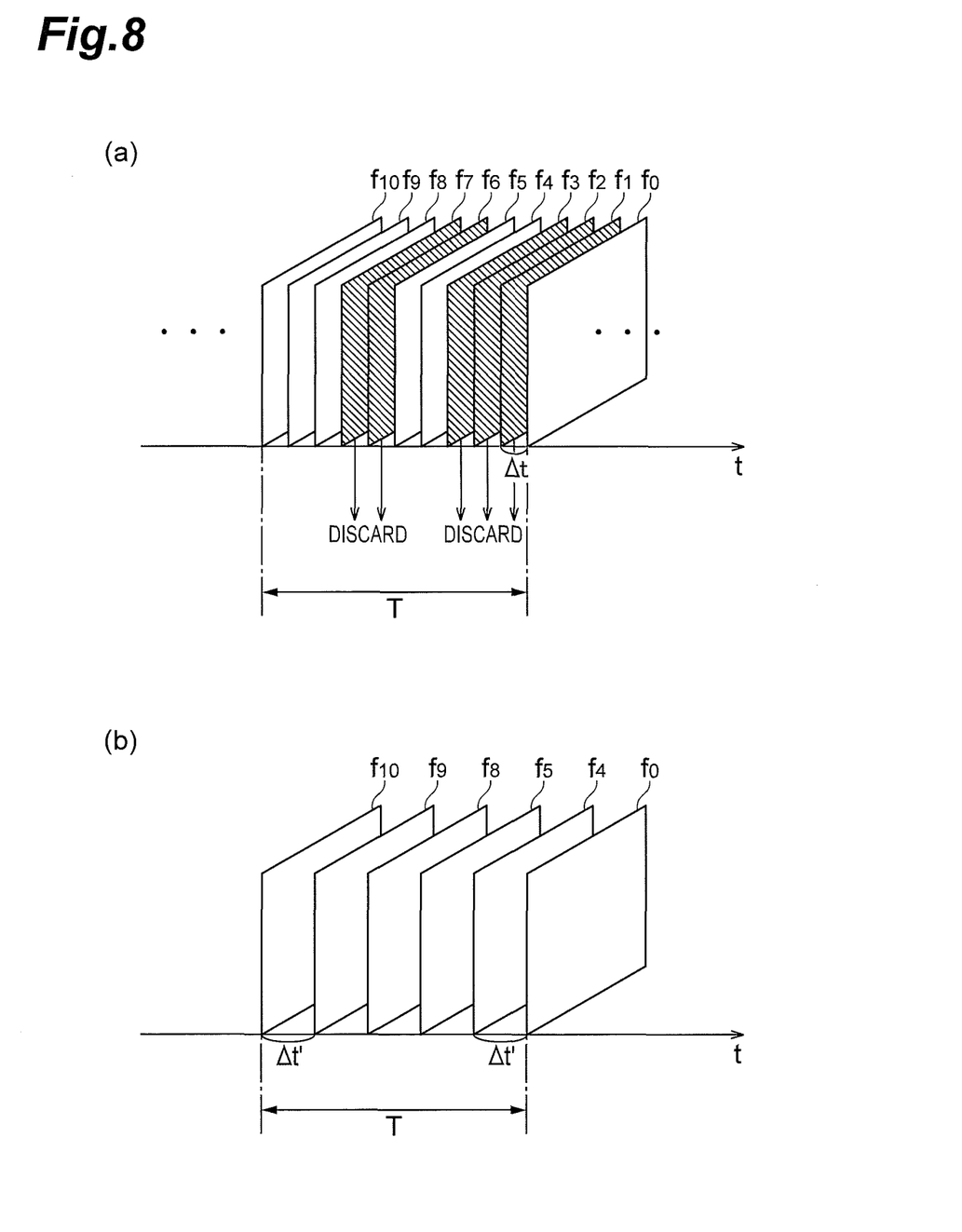
FIG. 8 is a view for showing a second example of the frame rate adjustment in the video image coded data displaying method according to the present invention.

On the other hand, as shown in the area (a) of FIG. 8, discarding the plurality of continuous image frames increases the maximum frame interval between the image frames to be displayed per unit time T. For instance, in the case of the area (a) of FIG. 8, when the image frames $f_1$ to $f_3$, $f_6$ to $f_7$ are discarded in the selection step during the execution of display control on the plurality of image frames $f_0$ to $f_{10}$ (frame rate: 11/T) disposed evenly at a frame interval of $\Delta t$ within the unit time T, the maximum frame interval per unit time T between the image frames $f_0$, $f_4$ to $f_5$, $f_8$ to $f_{10}$ to be decoded is $3\Delta t$, which is relatively large. When frame adjustment shown in the area (b) of FIG. 7 is performed in such a case, the observer recognizes the target image frames being displayed intermittently. For this reason, when the frame interval between the image frames to be decoded is large as shown in the area (a) of FIG. 8, it is preferred that the decoded target image frames be disposed evenly within the unit time (frame interval: $\Delta t'$), in a manner that the frame interval therebetween is constant (frame rate: 6/T), as shown in the area (b) of FIG. 8. Any of the frame rate adjustment steps shown in FIGS. 7 and 8 adjusts the frame rate only, and, since the quality of each target image frame to be displayed does not at all or hardly becomes deteriorated by the frame rate adjustment, deterioration of the quality of the video to be displayed can effectively be concealed by taking advantage of the visual characteristics of the observer. The frame rate adjustment can be carried out prior to or after the decoding, as long as the frame rate adjustment is performed after the error determination step.

It is clear from the description of the present invention above that various modifications can be made on the present invention. Such modifications shall not be excluded from the ideas and scope of the present invention, and improvements that will be obvious to those skilled in the art are intended to be included in the scope of the following claims.

The invention claimed is:

1. A displaying method for video image coded data which is configured by coded data of a plurality of compressed image frames each configured by a plurality of types of hierarchical scalabilities and distributed through predetermined transmission means, the method comprising:

a receiving step of sequentially receiving the coded data of the plurality of image frames through the transmission means;

an error determination step of calculating a missing data rate of missing data caused due to a transmission error, for the coded data of each of the scalabilities included in target image frames, which are to be displayed per unit time and disposed at a predetermined frame interval, from among the received image frames, and then searching, from among the received target image frames, a target image frame which has data quality deteriorated to a certain level or lower, the certain level being defined by a result of the calculation of the missing data rate and continuity of the received coded data;

a destruction determination step of determining re-transmission or discard for a deteriorated target image frame which is found in the error determination step;

a destruction step of discarding, from among the received target image frames, a deteriorated target image frame to be discarded which is determined in the destruction determination step;

a decoding step of decoding only the coded data of the target image frames remained from among the received target image frames;

an adjusting step of adjusting a frame rate on the basis of the number of the target image frames remained from among the received target image frames; and a display step of causing a predetermined display device to display the target image frames decoded in the decoding step, according to the adjusted frame rate.

2. The displaying method for video image coded data according to claim 1, wherein in the destruction determination step, a re-transmission request of missing data included in the received coded data is executed, prior to completion of reception of the coded data of the target image frames.

3. The displaying method for video image coded data according to claim 1, wherein, when the deteriorated target image frame is discarded in the destruction step, the adjusting step adjusts the frame rate by maintaining time-axial positions of the target image frames before the destruction step.

4. The displaying method for video image coded data according to claim 1, wherein, when the deteriorated target image frame is discarded in the destruction step, the adjusting step adjusts the frame rate by disposing the target image frames decoded in the decoding step evenly within the unit time, such that a frame interval thereof is constant.

5. The displaying method for video image coded data according to claim 1, wherein the coded data of the target image frames received in the receiving step each include a plurality of types of information arranged according to a priority order, and the coded data of the target image frames are distributed sequentially in descending order of priority of the plurality of types of information.

6. The displaying method for video image coded data according to claim 1, further comprising: detecting a pixel movement by comparing adjacent target image frames of the target image frames, and performing, on a space region of frame data of a target image frame in which the pixel movement is detected, weighting for determining a selection reference value in the error determination step.

7. The displaying method for video image coded data according to claim 2, wherein the coded data that corresponds to the missing data requested to be re-transmitted is distributed preferentially over other coded data that is scheduled to be transmitted.

8. A display device, comprising:

an input/output unit for importing, through predetermined transmission means, video image coded data configured by coded data of a plurality of compressed image frames each configured by a plurality of types of hierarchical scalabilities;

a memory for temporarily storing the video image coded data imported through the input/output unit;

a display unit, and a controller configured to:

calculating a missing data rate of missing data caused due to a transmission error, for the coded data of each of the scalabilities included in target image frames, which are to be displayed per unit time and disposed at a predetermined frame interval, from among the received image frames, and then searching, from among the stored target image frames, a target image frame which has data quality deteriorated to a certain level or lower, the certain level being defined by a result of the calculation of the missing data rate and continuity of the received coded data;

determining re-transmission or discard for a deteriorated target image frames which is found in the searching;

discarding, from among the stored target image frames, a destruction target image frames to be discarded which is found in the determining;

decoding only the coded data of the target image frames remained from among the received target image frames;

adjusting a frame rate on the basis of the number of the target image frames remained from among the received target image frames; and causing the display unit to display the target image frames decoded in the decoding, according to the adjusted frame rate.

9. A communication system for video image coded data which is configured by coded data of a plurality of compressed image frames each configured by a plurality of types of hierarchical scalabilities, the communication system comprising:

a reception terminal device for display of video image coded data which is configured by coded data of a plurality of compressed image frames each configured by a plurality of types of hierarchical scalabilities, the reception terminal device configured to:

sequentially receiving the coded data of the plurality of image frames;

calculating a missing data rate of missing data caused due to a transmission error, for the coded data of each of the scalabilities included in target image frames, which are to be displayed per unit time and disposed at a predetermined frame interval, from among the received image frames, and then searching, from among the received target image frames, a target image frames which has data quality that deteriorated to a certain level or lower, the certain level being defined by a result of the calculation of the missing data rate and continuity of the received coded data;

determining re-transmission or discard for a deteriorated target image frame which is found in the searching;

discarding, from among the received target image frames, a target image frames to be discarded which is determined in the determining;

decoding only the coded data of the target image frames remained from among the received target image frames;

adjusting a frame rate on the basis of the number of the target image frames remained from among the received target image frames; and causing a predetermined display device to display the target image frames decoded in the decoding, according to the adjusted frame rate; and a network for distributing the video image coded data, wherein the coded data of the target image frames, received by the reception terminal device, each include a plurality of types of information arranged according to a priority order, and the coded data of the target image frames are distributed sequentially in descending order of priority of the plurality of types of information.

10. The displaying method for video image coded data according to claim 1, wherein the searching searches the deteriorated target image frame with reference to a weighted missing data rate is set for each of the scalabilities.

* * * * *